US012663852B2

(12) United States Patent
Bhullar et al.

(10) Patent No.:  US 12,663,852 B2
(45) Date of Patent:  Jun. 23, 2026

(54) VIEWPORT-BASED AND REGION-OF-INTEREST-BASED RETRIEVAL OF MEDIA OBJECTS IN SCENE RENDERING ENGINES

(71) Applicant: InterDigital VC Holdings, Inc., Wilmington, DE (US)

(72) Inventors: Gurdeep Bhullar, Montreal (CA); Ahmed Hamza, Coquitlam (CA)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 18/719,652

(22) PCT Filed: Dec. 16, 2022

(86) PCT No.: PCT/US2022/053143
§ 371 (c)(1),
(2) Date: Jun. 13, 2024

(87) PCT Pub. No.: WO2023/114464
PCT Pub. Date: Jun. 22, 2023

(65) Prior Publication Data
US 2025/0053224 A1      Feb. 13, 2025

Related U.S. Application Data

(60) Provisional application No. 63/291,203, filed on Dec. 17, 2021.

(51) Int. Cl.
G06F 3/01       (2006.01)
G06T 7/70       (2017.01)
(52) U.S. Cl.
CPC ............... G06F 3/011 (2013.01); G06T 7/70 (2017.01); G06T 2207/30196 (2013.01); G06T 2207/30244 (2013.01)

(58) Field of Classification Search
None
See application file for complete search history.

(56) References Cited

U.S. PATENT DOCUMENTS

2020/0382796 A1 * 12/2020 Wang .................. H04N 19/119

FOREIGN PATENT DOCUMENTS

| | | |
|---|---|---|
| WO | 2019/199379 A1 | 10/2019 |
| WO | 2020/201632 A1 | 10/2020 |

OTHER PUBLICATIONS

What is GITF?, Khronos Group, 2022, 10 pages.

(Continued)

*Primary Examiner* — Christopher J Kohlman
(74) *Attorney, Agent, or Firm* — Condo Roccia Koptiw LLP

(57) ABSTRACT

A device may receive information associated with a plurality of cameras where each of the cameras has an associated camera object. The device may associate a first camera object with a first viewer. The first camera object may have associated first extrinsic properties and associated first intrinsic properties. The device may associate a second camera object with a second viewer. The second camera object may have associated second extrinsic properties and associated second intrinsic properties. The device may send a registration request to a Media Access Function (MAF) where the registration request identifies the first camera object and the second camera object. The first viewer and the second viewer may update their preferred views of media content, in response, the device may send an update request to the MAF, where the request comprises updated information associated with the first camera object and updated information associated with the second camera object.

20 Claims, 7 Drawing Sheets

(56)          References Cited

OTHER PUBLICATIONS

Bhullar, et al., "[SD] On Camera Intrinsic Interface", InterDigital, Inc., ISO/IEC JTC 1/SC 29/WG 3 m58190, Oct. 2021, pp. 1-2.
ISO/IEC, "Information technology—Coded Representation of Immersive Media—Part 5: Visual Volumetric Video-based Coding (V3C) and Video-based Point Cloud Compression (V-PCC)", International Organization for Standardization, ISO/IEC 23090-5:2021(2E), ISO/IEC JTC 1/SC 29/WG 07, 2021, 370 pages.
ISO/IEC, "Information Technology—Coded Representation of Immersive Media—Part 9: Geometry-Based Point Cloud Compression", ISO/IEC 23090-9:2022, Invention Disclosure, 2022, 187 pages.
ISO/IEC, "Potential Improvement of ISO/IEC 23090-14 Scene Description for MPEG Media", ISO/IEC JTC 1/SC 29/WG 03, N00321, MPEG Meeting 135, 2021, 84 pages.
The 3D Asset Delivery Format, Khronos Group, https://www.khronos.org/gitt/, 12 pages.
ISO/IEC, "Information technology—Coded Representation of Immersive Media—Part 3: Versatile Video Coding", ISO/IEC 23090-3:2021, Feb. 2021, 511 pages.
ISO/IEC, "Information Technology—Coding of Audio-Visual Objects—Part 15: Advanced Video Coding (AVC) file format", ISO/IEC 14496-15:2004, Apr. 2004, 30 pages.
ISO/IEC, "Information Technology—High Efficiency Coding and Media Delivery in Heterogeneous Environments—Part 2: High Efficiency Video Coding", ISO/IEC 23008-2:2013, Jan. 2013, 312 pages.

* cited by examiner

VIEWPORT-BASED AND REGION-OF-INTEREST-BASED RETRIEVAL OF MEDIA OBJECTS IN SCENE RENDERING ENGINES

CROSS-REFERENCE TO RELATED APPLICATION

This application is the National Stage Entry under 35 U.S.C. § 371 of Patent Cooperation Treaty Application No. PCT/US2022/053143 filed Dec. 16, 2022, which claims the benefit of U.S. Provisional Patent Application No. 63/291,203, filed Dec. 17, 2021, the contents of both of which are hereby incorporated herein by reference in their entireties.

BACKGROUND

A scene (e.g., 3D scene) may be described by scene description related information. The scene may be processed and rendered by a presentation engine. The presentation engine may retrieve and prepare media data to render the scene. Rendering of the scene may take into consideration a viewer's viewpoint. Parameters associated with a camera may be used for rendering the scene. Current implementations of the presentation engine may not be adequate.

SUMMARY

Systems, methods, and instrumentalities are disclosed for controlling a plurality of camera objects, each of which may be associated with a particular view of media content information. A device may be configured to receive and render media content information associated with each of the views particular to each of the plurality of camera objects.

The device may be configured to receive information associated with a plurality of cameras where each of the cameras has an associated camera object. The information associated with the plurality of cameras may comprise information indicating an associated ranking for each camera object associated with each of the respective plurality of cameras. The device may be configured to generate a listing of the plurality of cameras ordered according to the ranking. The device may receive inputs selecting from the listing particular cameras and associated camera objects through which the user wishes to view the media content information.

The device may be configured to associate a first camera object with a first viewer. The first camera object may be associated with a first camera and may have associated first extrinsic properties and associated first intrinsic properties. The device may be configured to associate a second camera object with a second viewer. The second camera object may be associated with a second camera and may have associated second extrinsic properties and associated second intrinsic properties. Extrinsic properties may comprise information associated with the pose (e.g., position and/or orientation) of the corresponding camera. Intrinsic properties may comprise information associated with a viewing volume of the corresponding camera.

The device may be further configured to send a registration request associated with the first camera object and the second camera object. The registration request may comprise information indicating the first camera object and the second camera object. The registration request may be sent to a system, which may be referred to as a Media Access Function (MAF), that is configured to request and forward media content information. The MAF may use the received information indicating the first camera object and the second camera object to request media content corresponding to the properties of those camera objects and to forward the media content corresponding to the first camera object and the second camera object to the device.

The device may further be configured to receive inputs from the first viewer and the second viewer regarding the aspects of the views of the media content each wishes to view. These inputs may be reflected in the first media object and the second media object. The device may be configured to send an update request reflecting changes to the first media object and the second media object. The device may send an update request, the update request comprising updated information associated with the first camera object and updated information associated with the second camera object. The update request may comprise an array wherein the array comprises updated information associated with the first camera object and updated information associated with the second camera object. The array may comprise a first index associated with the first camera object and a second index associated with the second camera object. The array may further comprise, associated with the first index, pose information associated with the first viewer, and associated with the second index, pose information associated with the second viewer.

The update request may be configured as an updateView function request. The updateView function request comprises at least one of a cameras object, a ViewInfos object, or a viewIDs. The at least one of the cameras object, the ViewInfos object, or the viewIDs object may comprise information associated with at least one of changed viewer poses or a changed camera intrinsic parameters. The updateView function request may comprise a ViewInfos argument, wherein the ViewInfos argument identifies information associated with at least one of a changed viewer poses or a changed camera intrinsic parameters. The updateView function request may comprise a ViewInfos object and a cameras object, wherein the ViewInfos object comprises an array associated with viewer poses, and the cameras object comprises information associated with cameras associated with the viewer poses.

The MAF may use the updated first camera object and the updated second camera object to request media content corresponding to the updated media objects. The MAF may the send, and the device may receive, media content associated with the first camera object and media content associated with the second camera object.

Systems, methods, and instrumentalities are disclosed for viewport-based and/or region-of-interest-based retrieval of media objects. A device may receive encoded media content information associated with a 3-dimensional (3D) scene and a plurality of camera objects associated with the 3D scene. Each of the plurality of camera objects may be associated with a camera. The device may determine a first camera object associated with a first camera from the plurality of camera objects based on a first viewpoint of a first viewer. The first camera object may include an intrinsic property and an extrinsic property. The device may update a view in the 3D scene based on the intrinsic property and the extrinsic property. The device may obtain a subset of the encoded media content information based on the updated view. In some examples, the device may determine a second camera object associated with a second camera from the plurality of camera objects based on a second viewpoint of a second viewer. In some examples, the extrinsic property may include pose information associated with the first viewer and the intrinsic property may include a view frustum of the first camera object. In some examples, the encoded media content information may include a volumetric visual media content.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

A rendering/presentation engine (for example, a game engine, such as Unity, Unreal Engine, etc.) may be used to compose and/or render a scene. The scene information may be provided by a scene description. One of the scene description formats may be graphics information format (e.g., Khronos' GL Transmission Format (gITF), which is short for graphics language transmission format). gITF may be a JavaScript Object Notation (JSON)-based file format and may provide a mechanism to refer to external binary and image file(s).

A graphics information format (e.g., Khronos gITF) may support static object with dynamicity (e.g., some forms of dynamicity) using animation. gITF may be used as a scene graph format (e.g., in/or MPEG). gITF may be extended to support dynamic content, such as, volumetric videos, 2D videos, and audio.

Support for dynamic (timed) media, such as 2D videos, volumetric visual media, audio, haptics, and the like may be implemented (e.g., for MPEG systems). The support for dynamic media may be enabled, e.g., using an extension mechanism in a graphics information format (e.g., Khronos' gITF). Media formats (e.g., MPEG-defined media formats), such as 2D videos encoded using various standards and volumetric visual media, may be used for scene description and may be in the syntax and semantics of gITF, e.g., via extension(s).

gITF may be used to specify how to playback a volumetric video. A reference architecture may include a Presentation Engine where a scene graph is loaded, and a Media Access Function (MAF), which may be responsible for requesting content from network or disk. The MAF may process returned media in pipelines and may provide it as buffer(s) to a Presentation Engine. A Presentation Engine may have capabilities to load a scene graph format, such as gITF. The Presentation Engine may be responsible for rendering a scene for viewer(s).

Figure 1:
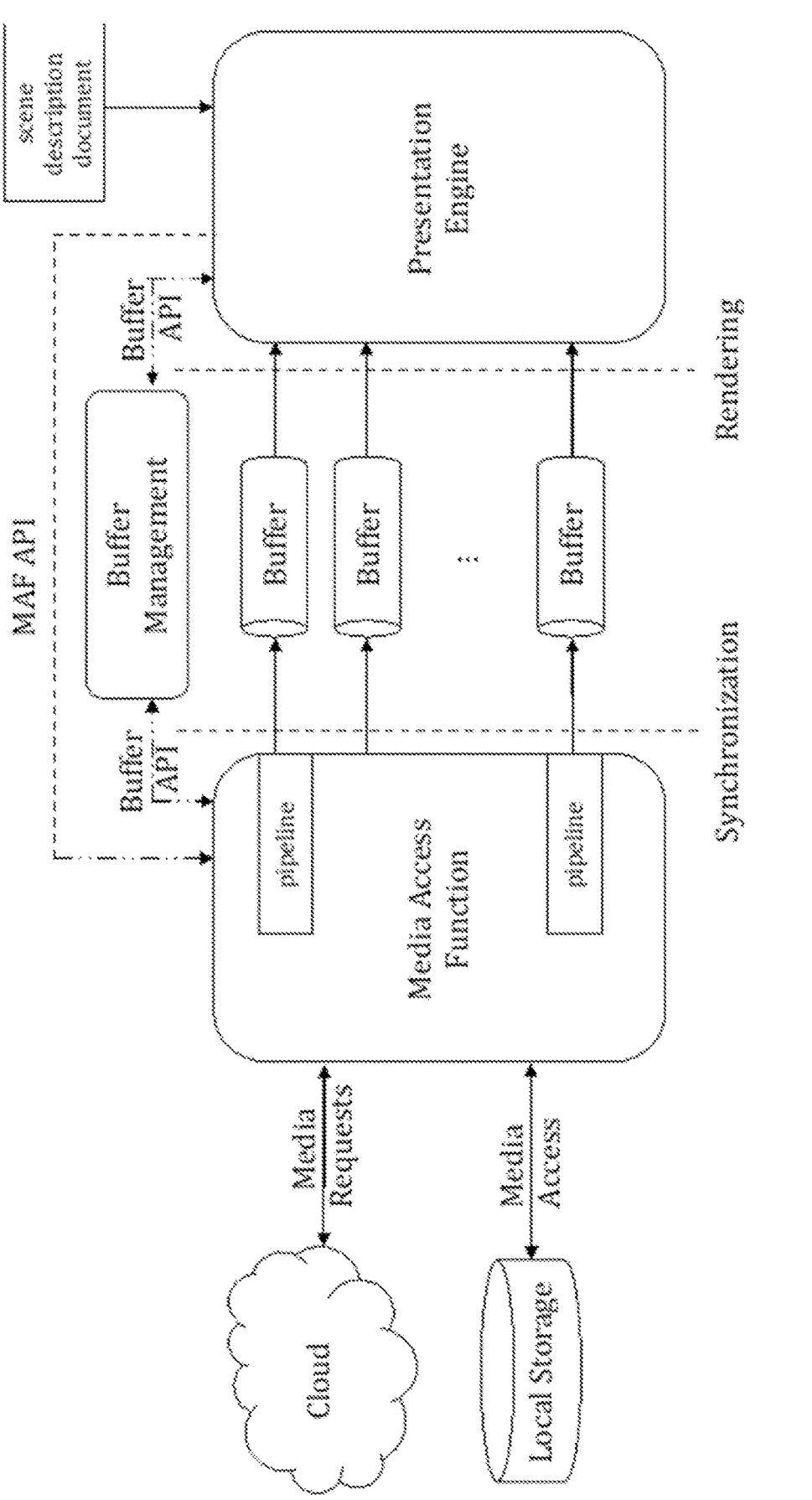
FIG. 1 illustrates a representation of an example (e.g., MPEG-I) scene description reference architecture.

FIG. 1 illustrates a representation of an example (e.g., MPEG-I) Scene Description reference architecture. The reference architecture may decouple the media access functionality from the presentation engine (e.g., rendering). A MAF entity may be introduced in the architecture. The MAF may be responsible for requesting, fetching, decoding, and/or post-processing the media data used by (e.g., required by) the presentation (e.g., rendering) engine to render the various media objects that are part of the scene.

A means to communicate between the MAF and the rendering client may be established, e.g., using an Application Programming Interface (API). The MAF API may provide information on a state (e.g., a current state) of the presentation client. The MAF may have responsibility to ensure which media may be necessary for a viewer of the scene. The MAF API may support information related to pose of the viewer/objects in a scene, buffer information, time information, media information, etc.

The MAF API may lack support for multiple viewers, wherein multiple viewers may view the scene rendered by the Presentation Engine from (e.g., potentially) different vantage points. Each viewer may have a different rendered view of the scene composed by the Presentation Engine.

A Presentation Engine may be a rendering engine that processes and/or renders a 3D scene described by a scene description document and/or corresponding scene description data.

A Media Access Function (MAF) may be a logical entity whose function may be to retrieve and/or prepare media for rendering on request by a presentation engine.

The MAF may provide an ability to represent the (e.g., current) positions of an object (e.g., a transform of an object) for which the media may be accessed and the viewer's pose (e.g., using camera extrinsic parameters). This information may be useful to adjust the media access to the visibility of the object. For example, a far object may be accessed at a lower Level-of-Detail (LoD).

A ViewInfo may represent the (e.g., current) positions of an object for which a media may be accessed and/or a viewer's pose. This information may be useful to adjust the media access to the visibility of the object. For example, a far object may be accessed at a lower Level of Detail (LoD). The ViewInfo may include pose information of the viewer, which may be provided as a position and orientation. The ViewInfo may include the position and orientation of the object as a transform (e.g., a 4×4 matrix as defined by gITF 2.0). Information described herein (e.g., the positions of the object, pose information of the viewer, and/or the transform of the position and orientation of the object) may use the scene's coordinate system.

A media pipeline may be a chain of media processing components to process a media. A media pipeline may be specific to a media.

A recommended viewport extension (e.g., a MPEG viewport recommended extension) may be identified by MPEG_viewport_recommended. The recommended viewport extension may provide a link from a camera object (e.g., as defined in a file format, such as gITF 2.0) to recommended viewport information by referencing to a MPEG accessor timed, where a sample of recommended viewport information may be made available.

The recommended viewport information may provide (e.g., dynamically) changing information, which may include translation and/or rotation of the node that includes the camera object and/or the intrinsic camera parameter of the camera object. A client may render a viewport according to the (e.g., dynamically) changed information.

In a scene description (e.g., a MPEG Scene Description), with the use of a recommended viewport extension (e.g., a MPEG_viewport_recommended extension), a list of external camera objects may be obtained, e.g., from a timed metadata track. The extrinsic and/or intrinsic properties of the camera objects in MPEG_viewport_recommended extension may be dynamic, e.g., the parameters for a camera (e.g., pose, view frustrum) may be changed (e.g., over time).

In a Presentation Engine, a view of the scene for a viewer may be determined by a camera used for rendering the scene, e.g., from the viewer's viewpoint. In a gITF file, there may be configuration(s)/indication(s) (e.g., provision(s)) for signaling the specific extrinsic (e.g., a pose (e.g., position and orientation) of the camera) and/or intrinsic camera properties (e.g., projection matrix information of the camera).

There may be one viewer (e.g., only one viewer) for the scene and one camera object may be used at a time. A scene may be rendered from the camera object, e.g., after composition. One or more parameters associated with the camera object may provide detailed information about the pose of the camera (e.g., using extrinsic parameters) and the viewing volume (e.g., using intrinsic parameters). Using the camera information, the MAF may generate details on the objects in the scene that may be in the viewing volume of the camera at a given time instance. At a given time instance, for example, the viewing volume of the camera may intersect some objects of the scene. Some objects of the scene may be fully enclosed or may be partially enclosed in the viewing volume at a given time instance. The MAF may perform intelligent inference to request media (e.g., volumetric visual media content) that may correspond to the region of interest at a given time instance. In examples, partial access may be enabled of a static or dynamic volumetric visual media content, e.g., for a viewer watching the scene. The scene may be represented using a scene graph such as gITF in a presentation client. The MAF may have an ability to request and may have an ability to retrieve a subset of (e.g., only a subset) of the media information, e.g., using the viewer's viewport and/or view frustrum information in a presentation client.

Multiple cameras may be used to render and/or compose different viewpoints for different viewers of the same scene (e.g., in an online conferencing application with multiple users). A media pipeline may be (e.g., tightly) coupled with a type of the media and it may not be desirable to have multiple media pipelines for the same content for different viewers. The MAF may allow a media pipeline for a media content to be used for composition and rendering for different viewers.

Information about the camera used to provide a viewer's viewport of the scene (e.g., including intrinsic and extrinsic camera parameters) may be required by the MAF to identify and/or to request the appropriate media for a (e.g., each) viewer of the scene.

In some examples, there may be limited support for providing camera information (e.g., information associated with a viewer's viewport of a scene). For example, only extrinsic camera parameters may be retrieved using a specific MAF API (e.g., ViewInfo). There may be no support in the MAF for obtaining intrinsic information of a camera and handling different viewpoints at the same time in the Presentation Engine.

Support may be provided for handling multiple viewpoints associated with a plurality of camera objects in the Presentation Engine. A device, which may comprise a Presentation Engine executing thereon, may be configured receive information associated with a plurality of cameras where each of the cameras has an associated camera object. The device may associate a first camera object with a first viewer. The first camera object may be associated with a first camera and may have associated first extrinsic properties and associated first intrinsic properties. The device may associate a second camera object with a second viewer. The second camera object may be associated with a second camera and may have associated second extrinsic properties and associated second intrinsic properties. The device may send a registration request to a Media Access Function (MAF) where the registration request identifies the first camera object and the second camera object. The first viewer and the second viewer may update their preferred views of media content. In response, the device may send an update request to the MAF, where the request comprises updated information associated with the first camera object and updated information associated with the second camera object. The MAF may modify the media content that is collected for the first camera object and the second camera object based upon the updated information received from the device. The modified media content for the first camera object and the modified media content for the second camera object may be communicated by the MAF and received at the device where it may be rendered.

A Media Access Function (MAF) interface may enable a Presentation Engine to provide the MAF with a list of the cameras used in the presentation client and their intrinsic properties.

A pose of a viewer may be given (e.g., directly or indirectly) by the extrinsic properties of a rendering camera, which may be associated with the viewer and may be used by a presentation client. In many applications there may be multiple rendering cameras used by a rendering client (e.g., for different viewers). For example, each viewer may have a different set of intrinsic properties for their respective camera.

The MAF may collect the camera intrinsic information and (e.g., in some examples) the extrinsic camera parameters from the Presentation Engine which may allow the MAF to determine which parts of the media content intersect with the region-of-interest. Receipt of the intrinsic and extrinsic camera object properties at the MAF may enable features, such as, for example, partial access where (e.g., only) parts of the media may be related to (e.g., intersecting) a (e.g., certain) region-of-interest for the viewer, or requesting an object intersecting the viewing volume of the viewer's camera. The MAF may (e.g., then) request the relevant media files associated with the region-of-interest of a (e.g., each) viewer.

In the case of a volumetric video content, one or more parts of the volumetric visual media content associated with a viewport of a viewer may be identified. The identified parts may include or may be parts of the volumetric visual media content that may be subsumed/intersected by the view frustum of the viewer's camera watching the scene. The view frustrum of the viewer's camera may be determined by the camera intrinsic parameters used by the presentation engine to render a camera view for the viewer.

Camera parameters for a MAF API may be implemented. A Camera parameter may be introduced for a MAF API. An example interface for the Camera parameter may be as shown in Table 1. The Camera parameter may provide a list of active rendering cameras, where an (e.g., each) item in the list may provide information about intrinsic properties of a corresponding camera. The information about the intrinsic properties may include a type of camera projection (e.g., perspective, orthographic, etc.) and may include (e.g., other) intrinsic parameters that define the camera's viewing frustum. Properties related to a (e.g., each) camera type may be accessed using the Camera interface. These properties may include an aspect ratio, a Y-FoV, a width and a height of the view frustrum, and near and far clipping planes.

TABLE 1

Camera Interface

```
interface Camera {
    readonly attribute CameraProjectionType type;
    switch(type){
        case 1:
            readonly attribute PerspectiveCameraViewingVolume;
        case 2:
            readonly attribute OrthographicCameraViewingVolume;
    };
    readonly attribute double zNear;
    readonly attribute double zFar;
};
Enum CameraProjectionType {"PERSPECTIVE", "ORTHOGRAPHIC"};
Struct PerspectiveCameraViewingVolume {
    double aspectRatio;
    double yFov;
};
Struct OrthographicCameraViewingVolume {
    double xmag;
    double ymag;
};
```

TABLE 2-continued

Camera parameter semantics

| Name | Type | Default | Description |
|---|---|---|---|
| zNear | double | N/A | The distance to the near clipping plane |
| zFar | double | N/A | The distance to the far clipping plane |

TABLE 3

Perspective Camera View Frustum

| Name | Type | Default | Description |
|---|---|---|---|
| yFOV | double | N/A | The vertical field-of-view in radians |
| aspectRatio | double | N/A | Aspect ratio of the viewport |

TABLE 4

Orthographic Camera View Frustrum

| Name | Type | Default | Description |
|---|---|---|---|
| xMag | double | N/A | Magnification of camera in the X-direction |
| yMag | double | N/A | Magnification of camera in the Y-direction |

TABLE 5

Camera projection type

| Name | Type | Default | Description |
|---|---|---|---|
| PERSPECTIVE | CameraProjectionType | N/A | Indicates that the camera may use perspective projection |
| ORTHOGRAPHIC | CameraProjectionType | N/A | Indicates that the camera may use orthographic projection |

Example semantics of the various attributes and/or fields defined in Camera parameter are provided in Table 2-Table 5.

TABLE 2

Camera parameter semantics

| Name | Type | Default | Description |
|---|---|---|---|
| projectionType | enumeration | PERSPECTIVE | The projection type of the camera used for rendering a viewpoint (see Table 4) |
| viewingVolume | object | N/A | View frustrum of the camera (see Tables 2 and 3) |

Table 6 provides an example pseudo-compliant gITF file that illustrates how the Cameras property may be used. In the example gITF file, there may be two camera items in the "cameras" array. Each camera item may have a list of properties that may determine intrinsic properties of the respective camera (e.g., the content within the square brackets after "cameras"). There may be two nodes (e.g., the content within the first set of curly brackets after "nodes") which may determine extrinsic properties, such as the Translation Rotation and Scale (TRS) of each camera. Each camera node refers to an index of a camera item in the "cameras" array. In the following example, the first camera node refers to the camera item at index 0 in the "cameras" array.

TABLE 6

| Cameras property in gITF |
|---|

```
...
"cameras": [
    {
        "type": "perspective",
        "perspective": {
        "aspectRatio": 1.0,
            "yfov": 0.7,
            "zfar": 100,
            "znear": 0.01
        }
    },
    {
        "type": "orthographic",
        "orthographic": {
            "xmag": 1.0,
            "ymag": 1.0,
            "zfar": 100,
            "znear": 0.01
        }
    }
],
"nodes": {
    ...
    {
        "translation" : [ 0.5, 0.5, 3.0 ],
        "camera" : 0 //<- refers to the first item in the cameras
array
    },
    {
        "translation" : [ 0.5, 1.5, 3.0 ],
        "camera" : 1 //<- refers to the second item in the cameras
array
    }
}
...#
```

To determine a view frustrum used for rendering a viewpoint for a viewer and/or to retrieve relevant media information (e.g., part(s) of the media that may intersect with the view frustrum), an update View( ) method and startFetching( ) method may include an argument for camera intrinsic properties. An example description of updated method(s) is shown in Table 7. Table 8 shows an example interface for a media pipeline, which may include an updateView( ) method and a startFetching( ) method.

TABLE 7

| Description of MAF API | | |
|---|---|---|
| Method | State after Success | Description |
| startFetching(timeInfo, viewInfo, camera) | ACTIVE | If initialized and in a READY state, the Presentation Engine may request the media pipeline to start fetching the requested data. The media request may be performed according to information provided by the viewInfo and the camera arguments. |
| updateView(viewInfo, camera) | ACTIVE | update View(viewInfo, camera) may be utilized/referred by the Presentation Engine to update the view information, e.g., if the pose of the viewer has changed (e.g., significantly enough to impact media access). To construct the view frustrum for each viewer, the camera intrinsic may be provided as an argument to the method. It may not be expected that every pose change results in a call to this function. If the viewer's camera intrinsic parameters are changed, this method may be utilized/referred. |

TABLE 8

| interface definition language (IDL) for Media Pipeline |
|---|

```
interface Pipeline {
    readonly attribute Buffer buffers[ ];
    readonly attribute PipelineState state;
    attribute EventHandler onstatechange;
    void
  initialize(MediaInfo mediaInfo, BufferInfo bufferInfo[ ]);
        void startFetching(TimeInfo timeInfo, ViewInfo viewInfo,
Camera camera);
        void updateView(ViewInfo viewInfo, Camera camera);
        void stopFetching( );
        void destroy( );
    };
```

The ViewInfo interface may include intrinsic camera parameters (e.g., in addition to the viewer's pose information (e.g., extrinsic camera parameters). This may be implemented by including an attribute of type Camera

TABLE 9

| Alternative ViewInfo IDL |
|---|

```
interface ViewInfo {
    attribute Pose pose ;
    attribute Camera camera;
};
struct Camera {
    readonly attribute CameraProjectionType type;
    switch(type){
        case 1:
            readonly attribute PerspectiveCameraViewingVolume;
        case 2:
            readonly attribute OrthographicCameraViewingVolume;
    };
    readonly attribute double zNear;
    readonly attribute double zFar;
};
Enum CameraProjectionType {"PERSPECTIVE", "ORTHOGRAPHIC"};
Struct PerspectiveCameraViewingVolume {
    double aspectRatio;
    double yFov;
};
Struct OrthographicCameraViewingVolume {
    double xmag ;
    double ymag ;
};
```

Table 9 shows an example (e.g., alternative) ViewInfo IDL. In such example, the function signature for updateView( ) and startFetching( ) may be a suitable method/function.

Support for multiple viewers may be implemented. A MAF API may allow the MAF to query a Presentation Engine for relevant information. The relevant information may include information about the Presentation Engine's state. The MAF API may provide function(s) and parameter(s) (e.g., parameter definition(s)), e.g., to query the state of Presentation Engine.

Figure 2:
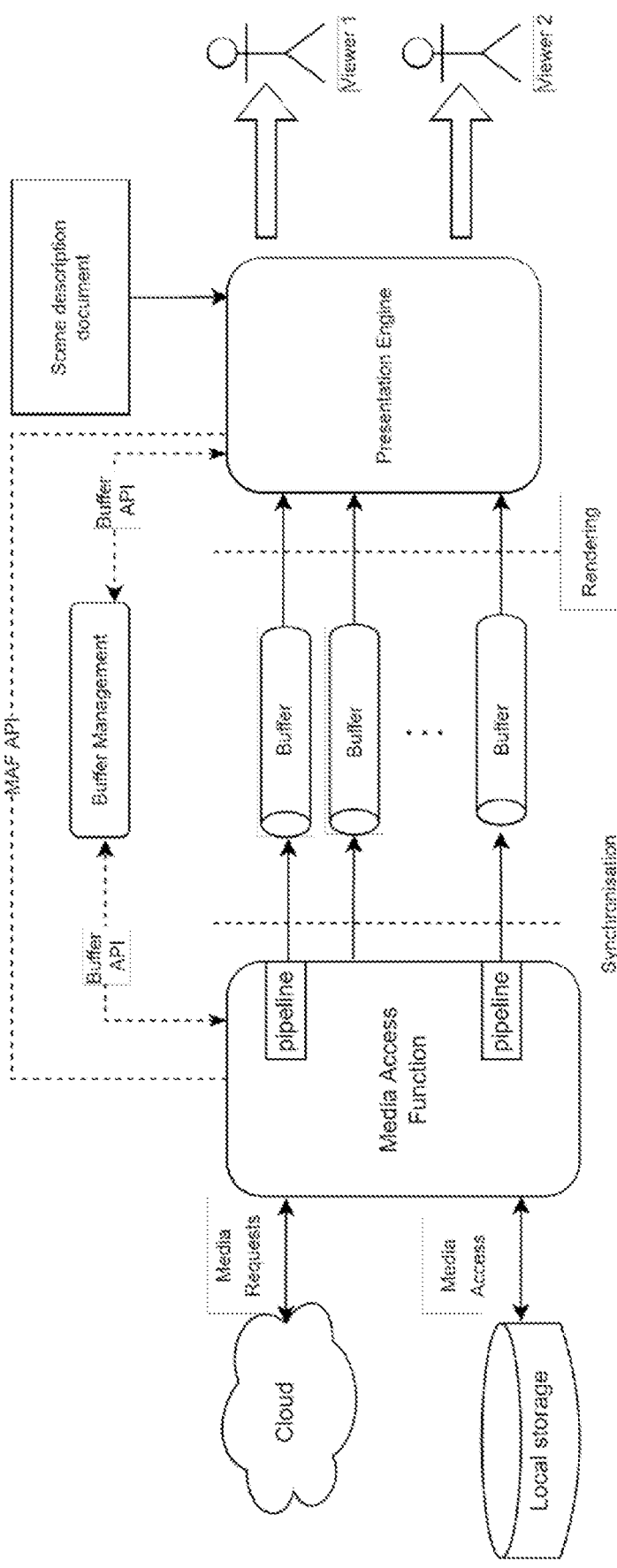
FIG. 2 illustrates an example presentation engine supporting multiple viewers.

FIG. 2 illustrates an example presentation engine supporting multiple viewers. A (e.g., each) viewer may be assigned a camera object. This camera object may be used for composing and/or rendering a viewport, which may be parameters), and/or an array of camera intrinsic parameters (e.g., an array of Camera parameters). The arguments to the startFetching( ) and updateView( ) methods/functions may be provided by the Presentation Engine. The first argument may provide index values for entries in ViewerPose and/or CamaraIntrinsics arrays, which the MAF may use to update relevant media information for a media pipeline. The elements in ViewerPose and CameraIntrinsics may follow a same index ordering. Table 11 shows an example interface for a media pipeline, which may include the startFetching( ) and updateView( ) methods.

The Presentation Engine (e.g., by using index values described herein) may provide viewer pose information and may provide camera intrinsic information, e.g., for the viewers, e.g., all viewers, being handled by the Presentation Engine.

TABLE 10

| Description of MAF API | | |
| --- | --- | --- |
| Method | State after Success | Description |
| startFetching(viewIDs, timeInfo, viewInfos, cameras) | ACTIVE | If initialized and in READY state, the Presentation Engine may request the media pipeline to start fetching the requested data. The media request may be made according to the viewInfo and the camera parameters |
| updateView(viewIDs, viewInfos, cameras) | ACTIVE | updateView(viewIDs, viewInfos, cameras) may be utilized/referred by a Presentation Engine to update the view information for viewer pose information and/or camera entries at index viewIDs. If the pose of the viewers has changed (e.g., significantly enough to impact media access), to construct the view frustrum for a (e.g., each) viewer, the camera intrinsic may be provided as an argument to the function. It may not be expected that every pose change results in a call to this function. In the event that the viewer's camera intrinsic parameters are changed, this method may be utilized/referred. | rendered for a viewer. Parameters may be associated with the camera object and may include intrinsic and/or extrinsic parameters of the camera (e.g., similar to as described in Tables 1-9).

The interface of the MAF may include functions(s) to fetch media and/or update the views for different viewers, e.g., given a (e.g., any) change in the parameters of their respective assigned camera objects. The MAF may be informed by the Presentation Engine to update the views and/or to provide relevant information for a (e.g., each) viewer, e.g., based on the changes to the parameters of each camera property.

Updating views and/or providing relevant information for viewers may be implemented in multiple ways.

In an implementation for updating views and/or providing relevant information, the Presentation engine may utilize (e.g., invoke), for example, the startFetching( ) method or function in Table 10, e.g., on an initialized media pipeline. The MAF may receive a call from the Presentation engine to update the views by calling, for example, the updateView( ) method/function in Table 10. The arguments to the method/function may be an array of camera object indexes, an array of viewers' pose information (e.g., an array of ViewInfo

TABLE 11

| IDL for Media Pipeline |
| --- |
| interface Pipeline { <br>     readonly attribute Buffer buffers[ ]; <br>     readonly attribute PipelineState state; <br>     attribute EventHandler onstatechange; <br>     void <br>    initialize(MediaInfo mediaInfo, BufferInfo bufferInfo[ ]); <br>     void startFetching(TimeInfo timeInfo, Integer ViewIDs[ ], <br> ViewInfo viewInfo[ ], Camera cameras[ ]); <br>     void updateView(Integer ViewIDs[ ], ViewInfo viewInfo[ ], <br> Camera cameras[ ]); <br>     void stopFetching( ); <br>     void destroy( ); <br> }; |

In an implementation for providing updated views and/or relevant information, the ViewInfo method/function may include the Camera intrinsic parameters, e.g., as shown in Table 9. An example of the startFetching( ) and updateView( ) function may be as shown in Table 12. Table 13 shows an example interface for a media pipleine, which may include the startFetching( ) and update View( ) methods.

TABLE 12

Description of MAF API

| Method | State after Success | Description |
|---|---|---|
| startFetching(viewIDs, timeInfo, viewInfos) | ACTIVE | If initialized and in READY state, the Presentation Engine may request the media pipeline to start fetching the requested data. The media request may be made according to the viewInfo and the camera parameters |
| update View(viewIDs, viewInfos) | ACTIVE | update View(viewIDs, viewInfos) may be utilized/referred by the Presentation Engine to update the view information for viewInfo at index viewID. The viewInfo may contain viewer pose and/or camera intrinsic information (e.g., as shown in table 9). This function may be utilized/referred by the Presentation Engine to update the view information, e.g., if the pose of the viewers and/or camera intrinsic have changed (e.g., significantly enough to impact media access). It may not be expected that every pose change results in a call to this function. In the event that the viewer's camera intrinsic parameters are changed, this function may be utilized/referred. |

TABLE 13

IDL for Media Pipeline

```
interface Pipeline {
    readonly attribute Buffer buffers[ ];
    readonly attribute PipelineState state;
``` array of ViewInfo, e.g., pose and camera information (e.g., as shown in Table 9) of the viewers, whose pose or intrinsic camera parameters may have changed. Table 14 shows an example description of startFetching( ) and update View( ) Table 15 shows an example interface for a media pipeline, which may include updateView( ) and startFetching( )

TABLE 14

Description of MAF API

| Method | State after Success | Description |
|---|---|---|
| startFetching(timeInfo, viewInfos) | ACTIVE | If initialized and in READY state, the Presentation Engine may request the media pipeline to start fetching the requested data. The media request may be made according to the viewInfo and the camera parameters |
| updateView(viewInfos) | ACTIVE | updateView(viewInfos) may be utilized/referred by the Presentation Engine to update the view information, e.g., if the pose of the viewers has changed (e.g., significantly enough to impact media access). It may not be expected that every pose change results in a call to this function. In the event that the viewer's camera intrinsic parameters are changed, this function may be utilized/referred. |

TABLE 13-continued

IDL for Media Pipeline

```
    attribute EventHandler onstatechange;
    void
initialize(MediaInfo mediaInfo, BufferInfo bufferInfo[ ]);
    void startFetching(TimeInfo timeInfo, Integer ViewIDs[ ],
ViewInfo viewInfos[ ]);
    void updateView(Integer ViewIDs[ ], ViewInfo viewInfos[ ]);
    void stopFetching( );
    void destroy( );
};
```

Information (e.g., only information) related to a subset of viewers may be provided as an argument to startFetching( ) and/or updateView( ) The ViewInfos argument may be an

TABLE 15

IDL for Media Pipeline

```
interface Pipeline {
    readonly attribute Buffer buffers[ ];
    readonly attribute PipelineState state;
    attribute EventHandler onstatechange;
    void
initialize(MediaInfo mediaInfo, BufferInfo bufferInfo[ ]);
    void startFetching(TimeInfo timeInfo, ViewInfo viewInfo[ ]);
    void updateView(ViewInfo viewInfo[ ]);
    void stopFetching( );
    void destroy( );
};
```

A subset (e.g., only a subset) of viewers may be provided as an argument to updateView( ) and startFetching( ) The ViewInfos argument may be an array of viewer pose and the Cameras argument may be intrinsic camera information for the viewers whose pose or camera parameters may have changed. Table 16 shows an example description of start-Fetching( ) and updateView( ) Table 17 shows an example interface for a media pipeline, which may include updateView( ) and startFetching( )

TABLE 16

Description of MAF API

| Method | State after Success | Description |
|---|---|---|
| startFetching(timeInfo, viewInfos, cameras) | ACTIVE | If initialized and in READY state, the Presentation Engine may request the media pipeline to start fetching the requested data. The media request may be made according to the viewInfo and the camera parameters |
| updateView(viewInfos, cameras) | ACTIVE | update View(viewInfos, cameras) may be utilized/referred by the Presentation Engine to update the view information if the pose of the viewers has changed significantly enough to impact media access. It may not be expected that every pose change results in a call to updateView( ). In the event that the viewer's camera intrinsic parameters are changed, this updateView( ) may be utilized/referred (e.g., utilized/referred immediately). |

TABLE 17

IDL for Media Pipeline

```
interface Pipeline {
    readonly attribute Buffer buffers[ ];
    readonly attribute PipelineState state;
    attribute EventHandler onstatechange;
    void
  initialize(MediaInfo mediaInfo, BufferInfo bufferInfo[ ]);
    void startFetching(TimeInfo timeInfo, ViewInfo viewInfo[ ],
Camera cameras[ ]);
    void updateView(ViewInfo viewInfo[ ], Camera cameras[ ]);
    void stopFetching( );
    void destroy( );
};
```

An implementation for identifying a recommended camera may be provided. A recommended viewport (e.g., MPEG_viewport_recommended extension introduced in MPEG-I Part 14) may be implemented to signal a camera object, which a presentation engine may use for rendering a recommended view of a scene. Such a recommendation may be a way for a content provider to (e.g., explicitly) signal a recommended viewpoint to view the content to a user, e.g., with a Presentation Engine.

An implementation for identifying a static camera recommendation may be provided. A recommended viewpoint may be static. This may imply that the properties of a camera object do not change over time, e.g., the extrinsic and/or intrinsic properties is/are static. A recommended viewport (e.g., a MPEG_viewport_recommended) may store an index to a camera node, e.g., as described in a scene description document.

Table 18 shows an example update to a recommended viewport extension (e.g., an MPEG_viewport_recommended extension) to include a behavior of a camera.

TABLE 18

| Name | Type | Default | Usage | Description |
|---|---|---|---|---|
| MPEG_viewport_recommended extension ||||| 
| name | string | N/A | O | Label of the recommended viewport |
| dynamic | Boolean | FALSE | M | May determine whether the camera object is static or dynamic. |
| If (dynamic == False) { cameraNode } | Number | N/A | M | May provide a reference to a camera node in a scene, which may be a recommended camera object specified by content authors to render the scene. |
| Else { translation | number | N/A | O | May provide a reference to accessor where timed data for the translation of camera object may be made available. The componentType of the referenced accessor may be FLOAT and the type may be VEC3, e.g., (x, y, z). |
| rotation | number | N/A | O | May provide a reference to accessor where the timed data for the rotation of camera object may be made available. The componentType of the referenced accessor may be FLOAT and the type may be VEC4, as a unit quaternion, e.g., (x, y, z, w). |
| cameraType | string | "perspective" | O | May provide a type of camera. |
| cameraParameters | number | N/A | O | May provide a reference to a timed accessor where the timed data for the perspective or orthographic camera parameters may be made available. The componentType of the referenced accessor may be FLOAT and the type may be VEC4. In the case of the type of the camera object that includes this extension is perspective, FLOAT_VEC4 may mean (aspectRatio, yfov, zfar, znear). In the case of orthographic type, FLOAT_VEC4 may mean (xmag, ymag, zfar, znear) |
| } |||||

Camera ranking may be implemented. A recommended viewport extension (e.g., an MPEG_viewport_recommended extension) may include a list of camera objects. The MPEG_viewport_recommended extension may include a ranking property, which may identify a ranking order for different camera objects. A presentation engine may order different camera objects depending on their respective ranking value (e.g., using such ranking property).

Table 19 is an example update to a recommended viewport extension (e.g., an MPEG_viewport_recommended extension) to include a camera ranking property.

TABLE 19

| Name | Type | Default | Usage | Description |
|---|---|---|---|---|
| MPEG_viewport_recommended extension ||||| 
| name | string | N/A | O | Label of the recommended viewport |
| ranking | number | 255 | O | May provide a logical ranking value for the camera object. Lower the value, higher may be the ranking. |
| dynamic | Boolean | FALSE | M | May determine whether the camera object is static or dynamic. |
| If (dynamic == False) { cameraNode } | Number | N/A | M | May provide a reference to a camera node in a scene, which may be a recommended camera object specified by content authors to render the scene. |

TABLE 19-continued

| MPEG_viewport_recommended extension | | | | |
|---|---|---|---|---|
| Name | Type | Default | Usage | Description |
| Else { | | | | |
| translation | number | N/A | O | May provide a reference to accessor where the timed data for the translation of camera object may be made available. The componentType of the referenced accessor may be FLOAT and the type may be VEC3, e.g., (x, y, z). |
| rotation | number | N/A | O | May provide a reference to accessor where the timed data for the rotation of camera object may be made available. The componentType of the referenced accessor may be FLOAT and the type may be VEC4, as a unit quaternion, e.g., (x, y, z, w). |
| cameraType | string | "perspective" | O | May provide a type of camera. |
| cameraParameters | number | N/A | O | May provide a reference to a timed accessor where the timed data for the perspective or orthographic camera parameters may be made available. The componentType of the referenced accessor may be FLOAT and the type may be VEC4. In the case of the type of the camera object that includes this extension is perspective, FLOAT_VEC4 may mean (aspectRatio, yfov, zfar, znear). In the case of orthographic type, FLOAT_VEC4 may mean (xmag, ymag, zfar, znear) |
| } | | | | |

In the case of multiple viewers, a presentation engine may provide different camera objects to the viewers. If camera ranking is available, the presentation engine may allocate a camera object with a highest ranking to a viewer (e.g., viewer 1) who may be interested in viewing the scene from a most preferred camera. Another viewer (e.g., viewer 2) may be interested in viewing the scene from the same camera object. In such case, the viewer 1 and viewers 2 may be using the same camera object. If multiple camera objects are available (e.g., two camera objects with one having a higher ranking than the other), viewer 2 may have a choice of two camera objects to view the scene.

An MAF may use information to make intelligent choices on which subset of media information to request from a server/local disk by, for example, requesting media that may be visible in a view frustum of camera(s) in a game engine.

One or more of the following may be carried out (e.g., in an MAF and/or presentation engine), e.g., to determine view information for multiple different viewers and/or to determine a subset of media information for a (e.g., each) viewer of a scene (e.g., the scene that is being rendered by a presentation engine).

The presentation engine(s), which may be implemented on one or more devices such as, for example, mobile computing devices, may load a scene graph (e.g., from a gITF file). The gITF may include a node, which may present a single media content and/or multiple media contents (e.g., volumetric visual media content(s)).

The media content (e.g., a volumetric visual media) may be encoded.

A node (e.g., every node) in a gITF node may have a Transformation matrix/TRS (Translation, Rotation, Scale) property associated with it. The media content (e.g., a volumetric visual media) may be attached to a node and may have a TRS property of the node in the scene.

The gITF file may have a recommended viewport extension (e.g., an MPEG_viewport_recommended extension). For example, the presentation engine operating on the device may receive information associated with a plurality of cameras, each of the plurality of cameras having an associated camera object. A list of camera objects may be available and a (e.g., each) camera object of the list may be assigned a ranking value. The presentation engine may choose camera objects from the list of camera objects provided by the MPEG_viewport_recommended extension. The presentation engine may order the different camera objects in their respective ranking order. In the case there are multiple viewers, a (e.g., each) viewer may have an option to pick a (e.g., any) camera object provided in the MPEG_viewport_recommended extension. Two viewers may be assigned with a same camera object or different camera objects.

The presentation engine may select a camera object for a viewer (e.g., if there is one viewer). If there are multiple viewers, each viewer may be assigned a camera object. One camera object may be selected for one viewer at a time by the presentation engine. Properties of the camera, such as extrinsic and intrinsic, may be provided by a gITF and/or by an external means (e.g., an MPEG_viewport_recommended extension). For example, the presentation engine may associate a first camera object with a first viewer, with the first camera object associated with a first camera and having associated first extrinsic properties and first intrinsic properties. The presentation engine may associate a second camera object with a second viewer, with the second camera object associated with a second camera and having associated second extrinsic properties and second intrinsic properties. A camera object (e.g., each camera object) may be used to render a viewpoint for a viewer. The camera may be attached to a node in the gITF file and the camera node may have its associated extrinsic parameters such as TRS. The camera object may have intrinsic properties associated with it, which may be projection matrix, etc. These intrinsic properties may identify a viewport size, a view frustrum of the camera. A presentation engine may register a viewer's view (e.g., a camera object) with the MAF. For example, the presentation engine operating on a device may send a registration request associated with the first camera object and the second camera object. The registration request may register the first camera object and the second camera object with the MAF.

The presentation engine may request the MAF to create a media pipeline for a corresponding media source.

The presentation engine may invoke a request on the created media pipeline for the media by utilizing startFetching( ) function. The MAF may consume the Camera and ViewInfo arguments (e.g., as shown in Table 9) provided in the startFetching( ) function and may make a media informed request.

The presentation engine may update a media access function to retrieve relevant information for a viewer, e.g., with an updateView( ) function. The arguments of the updateView( ) function may be Camera and ViewInfo objects (e.g., which may be achieved as shown in Table 7 and/or Table 9). The arguments to the function may include information about multiple viewers (e.g., in an array). For example, the presentation engine may send an update request comprising updated information associated with the first camera object and updated information associated with the second camera object. Viewer information (e.g., each viewer information) may include the intrinsic as well as extrinsic properties of a (e.g., each) camera, which may be retrieved using MAF API parameters (e.g., Camera parameter and/or ViewInfo parameter, as shown in Table 7 or Table 9).

The MAF may consume the Camera and ViewInfo arguments (e.g., as shown in Table 9) provided in the updateView( ) function. The Camera argument may provide information on a number of cameras being used for different viewers of the scene. The Camera argument may provide intrinsic parameters of a camera (e.g., each camera). The extrinsic parameters of a camera (e.g., each camera) may be provided through an ViewInfo argument.

Figure 3:
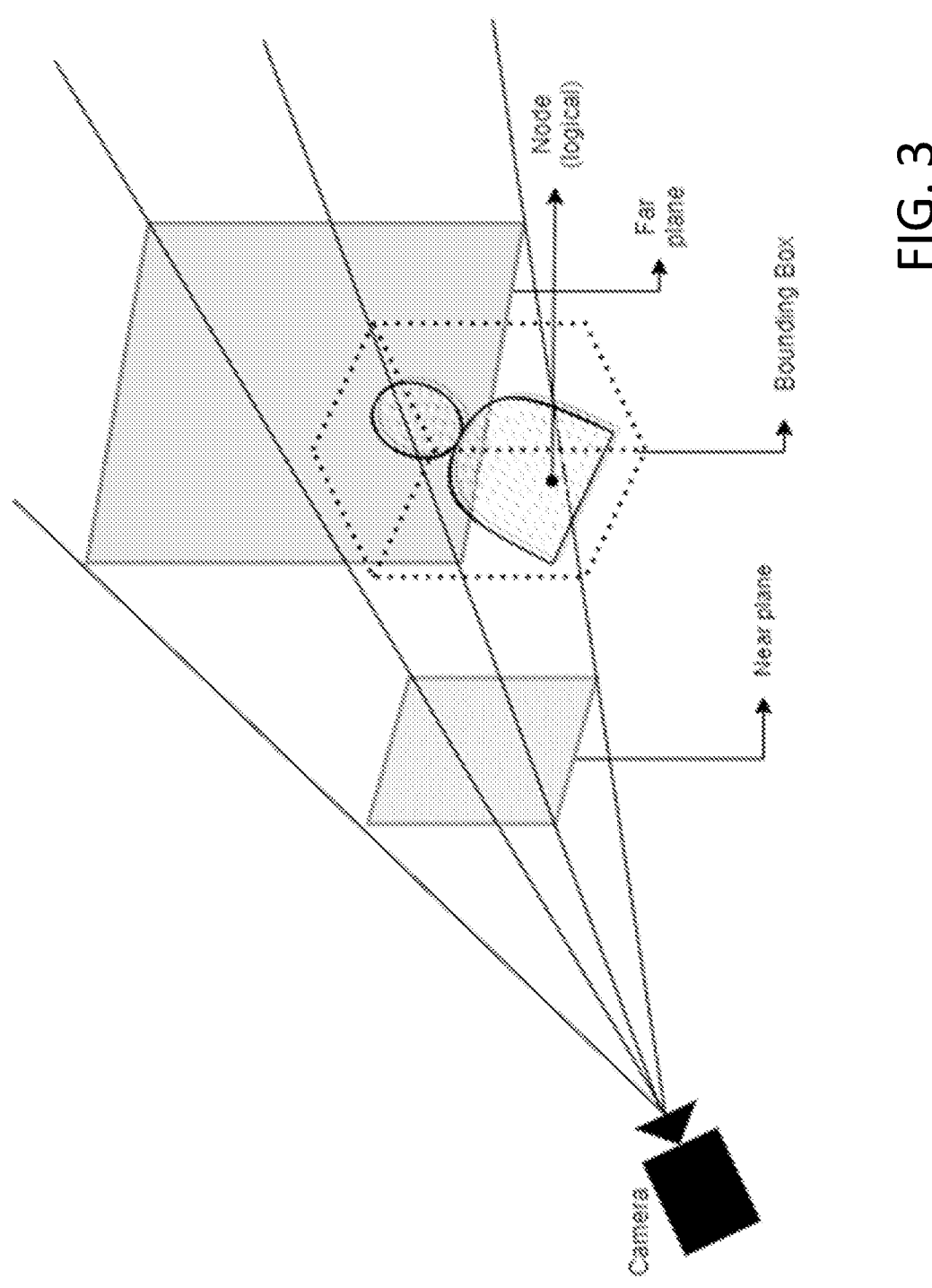
FIG. 3 illustrates a visual representation of a volumetric visual media that intersects a view frustrum.

The MAF may collect information on the nodes that are intersecting with or within a view frustrum of a camera (e.g., each camera), e.g., as shown in FIG. 3. FIG. 3 illustrates a visual representation of a volumetric visual media that intersects a view frustum. FIG. 3 shows only one camera for simplicity. A media content may be enclosed in a Bounding Box. Information on the intersection of the bounding box with the view frustum may be used to determine which subset(s) of the media is/are in the camera's view. The MAF may determine which nodes occlude other nodes, e.g., depending on the information retrieved from camera pose (e.g., as a part of camera extrinsic) and the view frustum (e.g., as a part of camera intrinsic)

Based on the information regarding the nodes that are intersecting with or within a view frustrum of the camera, the MAF may perform intelligence to determine a relevant subset of the media(s) information, which may be visible in the camera viewport. There may be multiple camera objects in a game engine, e.g., using a scene graph.

For media (e.g., volumetric visual) content, the MAF may have a Media Requesting Client, such as a DASH client or WebRTC client, which may be responsible for sending requests for the media content over a network.

A Media Client may use the inference regarding the relevant subset of the media information which may be visible in the camera viewport and may make an informed request(s) of relevant subset of the media information, e.g., from a server/disk for a viewer (e.g., each viewer) of the scene.

A change (e.g., any change) in the viewer pose or viewer camera parameters may cause the presentation engine to call the updateView( ) (e.g., again, as described herein).

Figure 4A:
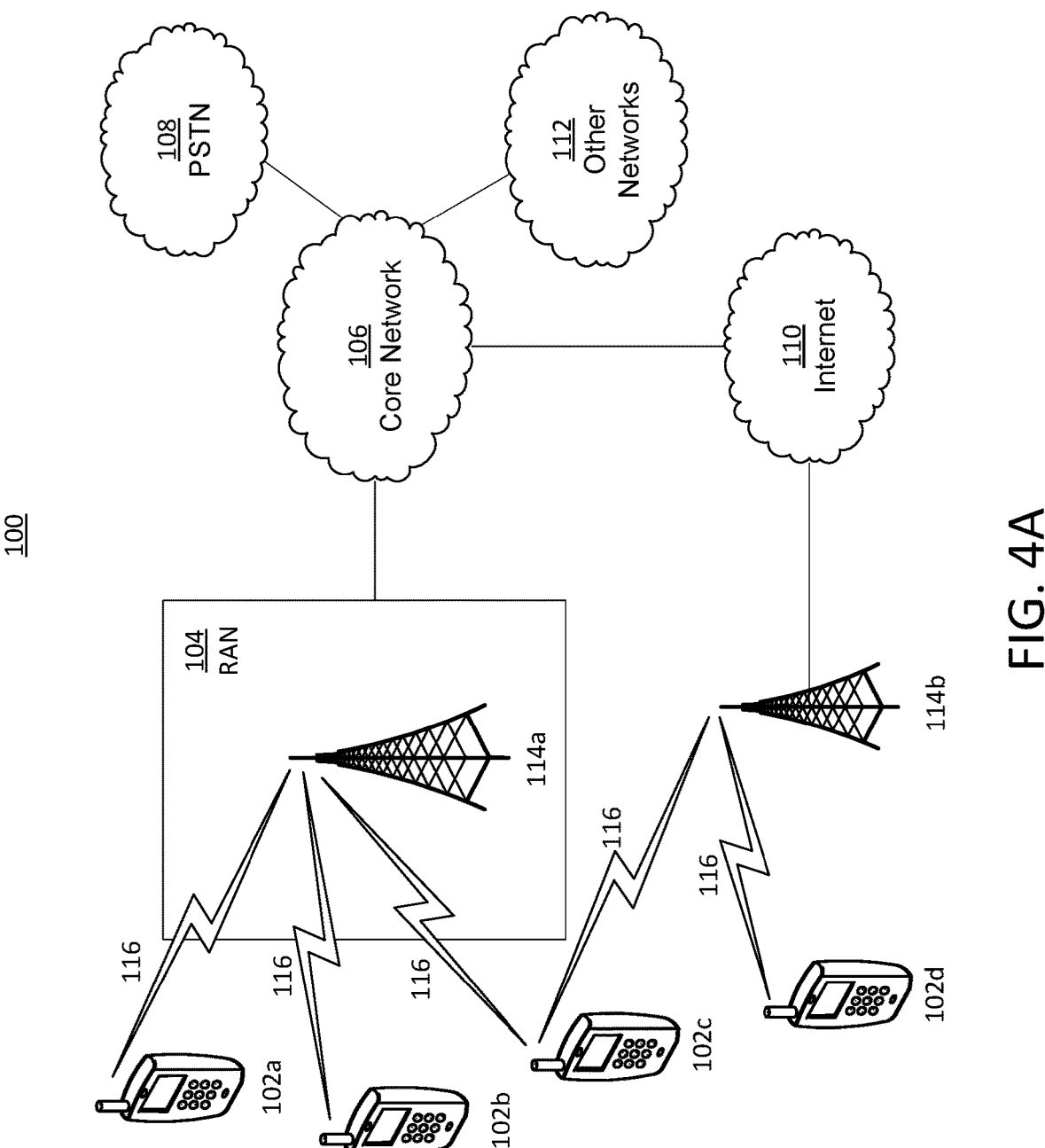
FIG. 4A is a system diagram of an example communications system in which one or more disclosed embodiments may be implemented.

FIG. 4A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 4A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114*a*. 114*b* may include any number of interconnected base stations and/or network elements.

The base station 114*a* may be part of the RAN 104/113, which may also include other base stations and/or network elements (not shown), such as a base station controller (BSC), a radio network controller (RNC), relay nodes, etc. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104/113 and the WTRUs 102*a*, 102*b*, 102*c* may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using New Radio (NR).

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., a eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 4A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 4A, the base station 114*b* may have a direct connection to the Internet 110. Thus, the base station 114*b* may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102*a*, 102*b*, 102*c*, 102*d*. The data may have varying quality of service (QOS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 4A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 4A may be configured to communicate with the base station 114a, which may employ a cellular-based radio technology, and with the base station 114b, which may employ an IEEE 802 radio technology.

Figure 4B:
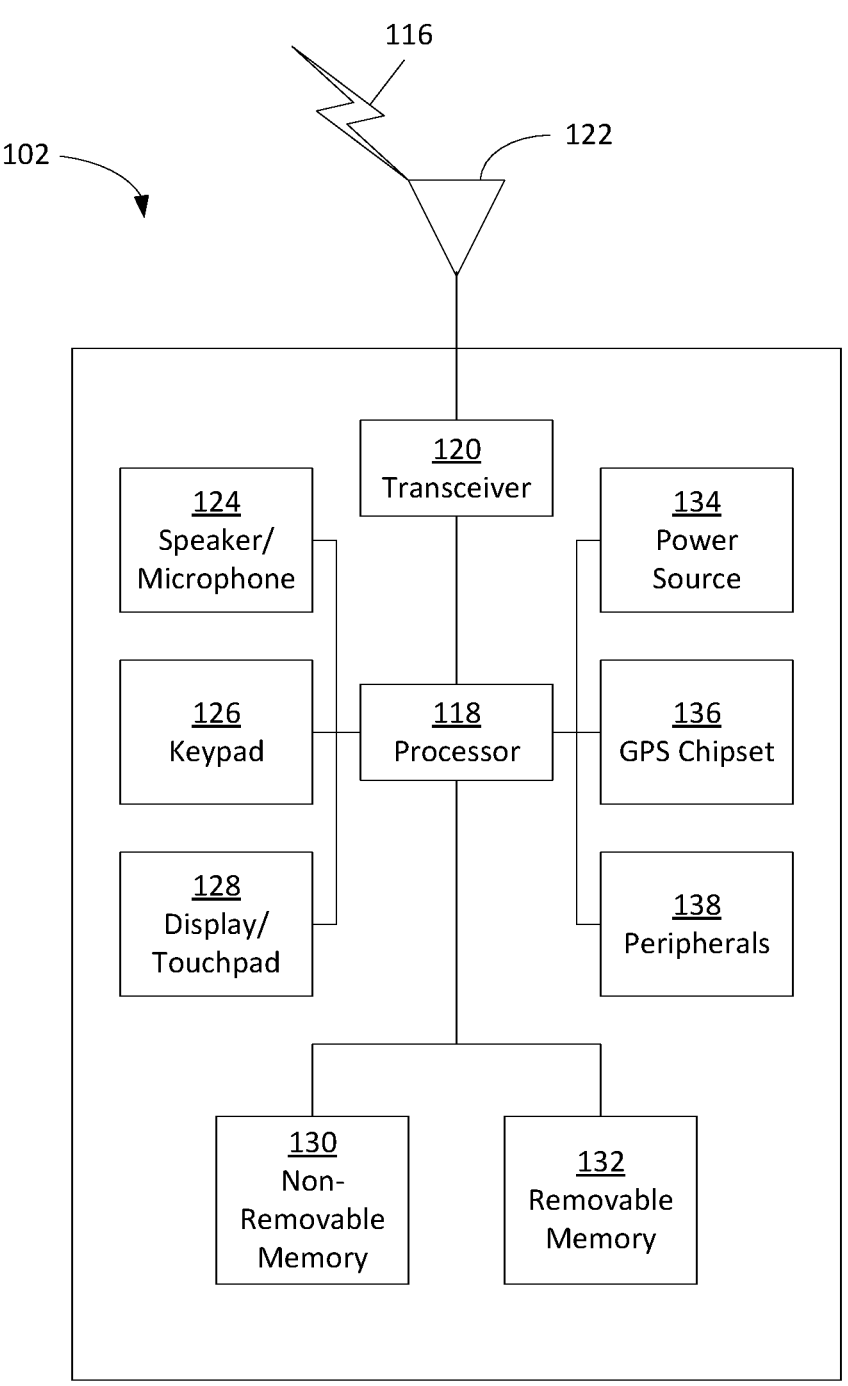
FIG. 4B is a system diagram of an example wireless transmit/receive unit (WTRU) that may be used within the communications system illustrated in FIG. 4A according to an embodiment.

FIG. 4B is a system diagram illustrating an example WTRU 102. As shown in FIG. 4B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 4B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 4B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception).

Figure 4C:
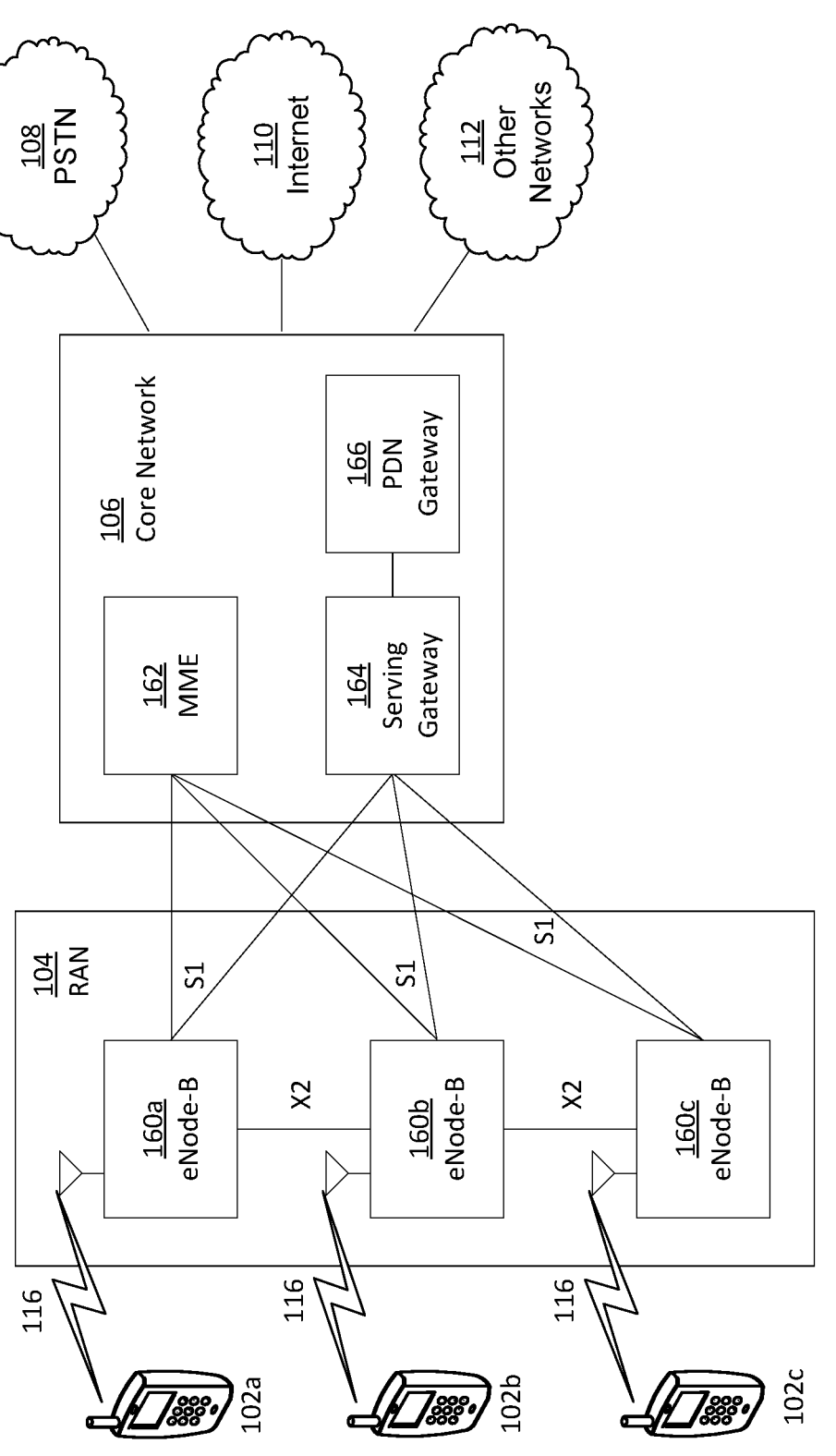
FIG. 4C is a system diagram illustrating an example radio access network (RAN) and an example core network (CN) that may be used within the communications system illustrated in FIG. 4A according to an embodiment.

FIG. 4C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 4C, the eNode-Bs 160a, 160b, 160c may communicate with one another over an X2 interface.

The CN 106 shown in FIG. 4C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 4A-4D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHZ, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHZ, 2 MHZ, 4 MHz, 8 MHZ, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHZ, 8 MHZ, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 4D:
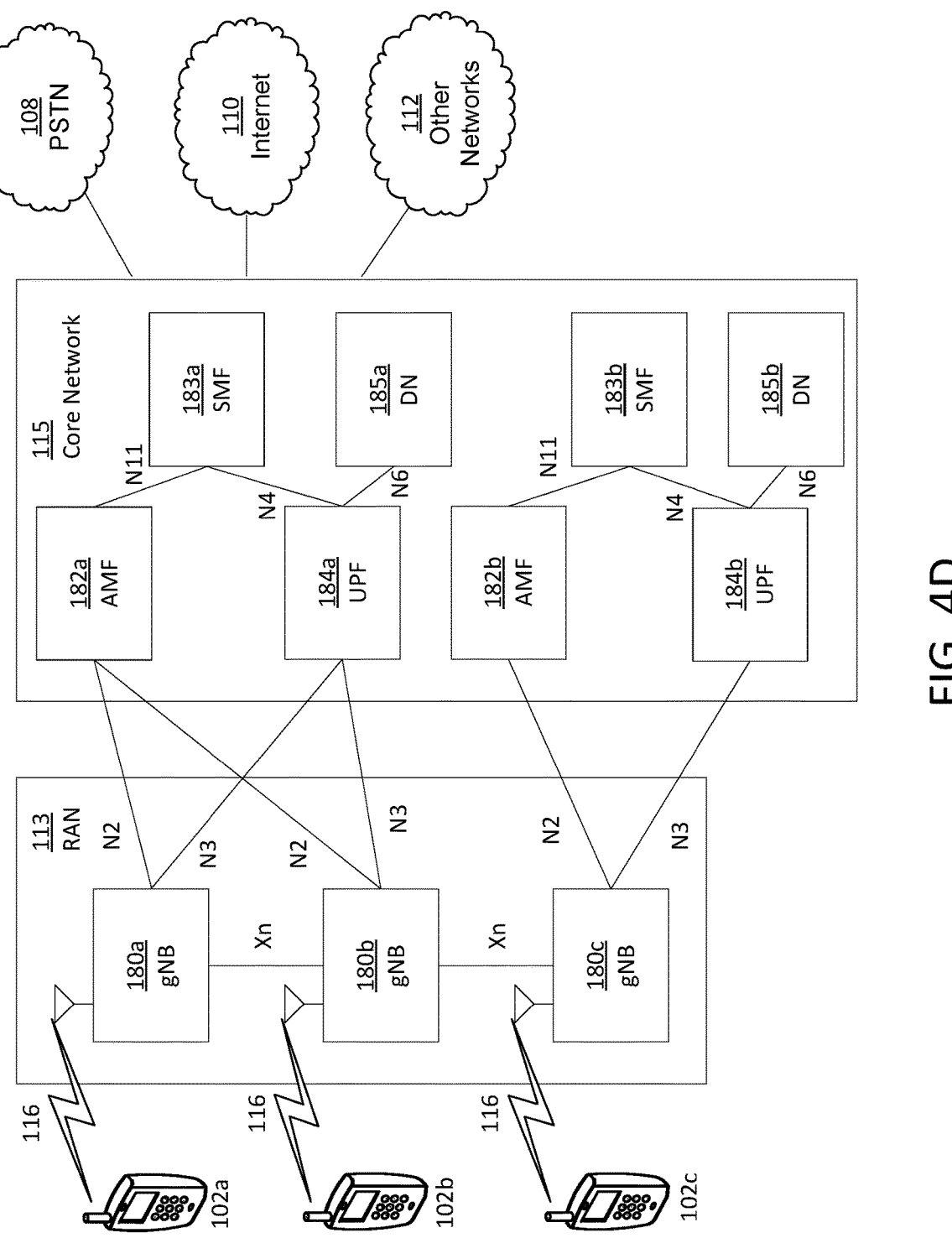
FIG. 4D is a system diagram illustrating a further example RAN and a further example CN that may be used within the communications system illustrated in FIG. 4A according to an embodiment.

FIG. 4D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (COMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 4D, the gNBs 180a, 180b, 180c may communicate with one another over an Xn interface.

The CN 115 shown in FIG. 4D may include at least one AMF 182a, 182b, at least one UPF 184a, 184b, at least one Session Management Function (SMF) 183a, 183b, and possibly a Data Network (DN) 184A, 184B. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182*a*, 182*b* may be responsible for authenticating users of the WTRUs 102*a*, 102*b*, 102*c*, support for network slicing (e.g., handling of different PDU sessions with different requirements), selecting a particular SMF 183*a*, 183*b*, management of the registration area, termination of NAS signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 115 via an N11 interface. The SMF 183*a*, 183*b* may also be connected to a UPF 184*a*, 184*b* in the CN 115 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 113 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local Data Network (DN) 184A, 184B through the UPF 184*a*, 184*b* via the N3 interface to the UPF 184*a*, 184*b* and an N6 interface between the UPF 184*a*, 184*b* and the DN 184A, 184B.

In view of FIGS. 4A-1D, and the corresponding description of FIGS. 4A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 184A-b, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data. Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, WTRU, terminal, base station, RNC, or any host computer.

Although features and elements are described herein in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

33

What is claimed:

1. A device comprising:
a processor configured to:
receive information associated with a plurality of cameras, each of the plurality of cameras having an associated camera object;
associate a first camera object with a first viewer, the first camera object associated with a first camera and having associated first extrinsic properties and associated first intrinsic properties;
associate a second camera object with a second viewer, the second camera object associated with a second camera and having associated second extrinsic properties and associated second intrinsic properties;
send a registration request associated with the first camera object;
send a registration request associated with the second camera object;
send an update request comprising updated information associated with the first camera object; and
send an update request comprising updated information associated with the second camera object.

2. The device of claim 1,
wherein the information associated with the plurality of cameras comprises for each of the plurality of cameras an associated ranking.

3. The device of claim 2,
wherein the processor is further configured to:
generate a listing of the plurality of cameras, the plurality of cameras ordered in the listing according to ranking.

4. The device of claim 1,
wherein the updated information associated with the first camera object comprises intrinsic properties and extrinsic properties; and
wherein the updated information associated with the second camera object comprises intrinsic properties and extrinsic properties.

5. The device of claim 1,
wherein the processor configured to send an update request comprising updated information associated with the first camera object and configured to send an update request comprising updated information associated with the second camera object is further configured to send one update request;
wherein the one update request comprises an array, the array comprising the updated information associated with the first camera object and the updated information associated with the second camera object.

6. The device of claim 5,
wherein the array comprises a first index associated with the first camera object and a second index associated with the second camera object.

7. The device of claim 6,
wherein the array further comprises, associated with the first index, pose information associated with the first viewer;
wherein the array further comprises, associated with the second index, pose information associated with the second viewer; and
wherein the first camera object is associated with a viewer ID and the second camera object is associated with a viewer ID.

8. The device of claim 1,
wherein the processor configured to send the update request comprising updated information associated with the first camera object and configured to send the update request comprising updated information associated with the second camera object is configured to send an updateView function request.

9. The device of claim 8,
wherein the updateView function request comprises a ViewInfos argument, the ViewInfos argument identifying information associated with at least one of a changed viewer poses or a changed camera intrinsic parameters.

10. The device of claim 8,
wherein the updateView function request comprises a ViewInfos object and a cameras object, the ViewInfos object comprising an array associated with viewer poses, and the cameras object comprising information associated with cameras associated with the viewer poses.

11. A method of controlling a plurality of camera objects, comprising:
receiving information associated with a plurality of cameras, each of the plurality of cameras having an associated camera object;
associating a first camera object with a first viewer, the first camera object associated with a first camera and having associated first extrinsic properties and associated first intrinsic properties;
associating a second camera object with a second viewer, the second camera object associated with a second camera and having associated second extrinsic properties and associated second intrinsic properties;
sending a registration request associated with the first camera object;
sending a registration request associated with and the second camera object;
sending an update request, the update request comprising updated information associated with the first camera object; and
sending an update request comprising updated information associated with the second camera object.

12. The method of claim 11,
wherein the information associated with the plurality of cameras comprises for each of the plurality of cameras an associated ranking.

13. The method of claim 12, further comprising:
generating a listing of the plurality of cameras, the plurality of cameras ordered in the listing according to ranking.

14. The method of claim 11,
wherein the updated information associated with the first camera object comprises intrinsic properties and extrinsic properties; and
wherein the updated information associated with the second camera object comprises intrinsic properties and extrinsic properties.

15. The method of claim 11,
wherein sending an update request comprising updated information associated with the first camera object and sending an update request comprising updated information associated with the second camera object comprises sending one update request;
wherein the one update request comprises an array, the array comprising the updated information associated with the first camera object and the updated information associated with the second camera object.

16. The method of claim 15,
wherein the array comprises a first index associated with the first camera object and a second index associated with the second camera object.

17. The method of claim 16, wherein the array further comprises, associated with the first index, pose information associated with the first viewer;

wherein the array further comprises, associated with the second index, pose information associated with the second viewer; and wherein the first camera object is associated with a viewer ID and the second camera object is associated with a viewer ID.

18. The method of claim 11, wherein sending the update request comprising updated information associated with the first camera object and sending the update request comprising updated information associated with the second camera object comprises sending an updateView function request.

19. The method of claim 18, wherein the updateView function request comprises a ViewInfos argument, the ViewInfos argument identifying information associated with at least one of a changed viewer poses or a changed camera intrinsic parameters.

20. The method of claim 18, wherein the updateView function request comprises a ViewInfos object and a cameras object, the ViewInfos object comprising an array associated with viewer poses, and the cameras object comprising information associated with cameras associated with the viewer poses.

* * * * *